United States Patent
Talbot

(10) Patent No.: US 7,505,332 B1
(45) Date of Patent: Mar. 17, 2009

(54) INPUT OFFSET CORRECTION FOR ASYMMETRIC CONTROL OF HIGH-SPEED BIDIRECTIONAL SIGNALING

(75) Inventor: Gerald R. Talbot, Concord, MA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 549 days.

(21) Appl. No.: 11/368,773

(22) Filed: Mar. 6, 2006

(51) Int. Cl.
*G11C 7/00* (2006.01)

(52) U.S. Cl. .............................. 365/189.09; 365/230.03

(58) Field of Classification Search ............ 365/230.03, 365/228, 189.09
See application file for complete search history.

(56) References Cited

U.S. PATENT DOCUMENTS

| | | | |
|---|---|---|---|
| 6,029,250 A | 2/2000 | Keeth | |
| 6,321,282 B1 | 11/2001 | Horowitz | |
| 6,374,360 B1 | 4/2002 | Keeth et al. | |
| 6,516,282 B2 | 2/2003 | Hedlund | |
| 6,526,109 B1 | 2/2003 | Chang et al. | |
| 6,643,787 B1 | 11/2003 | Zerbe et al. | |
| 6,839,393 B1 | 1/2005 | Sidiropoulos | |
| 6,877,103 B2 | 4/2005 | Kuo et al. | |
| 6,888,737 B2 * | 5/2005 | Chow | 365/145 |
| 7,043,652 B2 | 5/2006 | Matsui | |
| 7,305,574 B2 | 12/2007 | Ferraiolo et al. | |
| 7,346,795 B2 | 3/2008 | Klowden et al. | |
| 7,362,800 B1 | 4/2008 | Zerbe et al. | |
| 2002/0108069 A1 | 8/2002 | Keeth et al. | |
| 2004/0076192 A1 | 4/2004 | Zerbe et al. | |
| 2004/0098634 A1 | 5/2004 | Zerbe et al. | |
| 2004/0268190 A1 | 12/2004 | Kossel et al. | |
| 2005/0276261 A1 | 12/2005 | Kim | |
| 2006/0120409 A1 | 6/2006 | Zerbe et al. | |
| 2006/0206742 A1 | 9/2006 | James | |
| 2007/0002941 A1 | 1/2007 | Low | |
| 2007/0074086 A1 | 3/2007 | Goth | |
| 2008/0040571 A1 | 2/2008 | Ferraiolo et al. | |

* cited by examiner

*Primary Examiner*—Son Dinh
(74) *Attorney, Agent, or Firm*—Meyertons Hood Kivlin Kowert & Goetzel, P.C.; B. Noël Kivlin; Stephen J. Curran

(57) ABSTRACT

A system including input offset correction for asymmetric control of high-speed bidirectional signaling includes a slave device and a master device that is coupled to the slave device. The master device may control data transfer between the master device and the slave device. In response to the master device determining there is an input offset bias present within the slave device, the master device may adaptively modify a DC voltage offset of data transmitted by the master device based upon data eye information received from the slave device via one or more unidirectional signal paths.

9 Claims, 7 Drawing Sheets

INPUT OFFSET CORRECTION FOR ASYMMETRIC CONTROL OF HIGH-SPEED BIDIRECTIONAL SIGNALING

BACKGROUND OF THE INVENTION

1. Field of the Invention

This invention relates to communication links and, more particularly, to communication over bidirectional links.

2. Description of the Related Art

Many systems employ conventional high-speed bidirectional signaling schemes in which the work of controlling amplitude and phase of the signals sent over a channel may be divided equally between each end of a communication link. In such systems, the control of the link may be symmetric such that the transmitter and the receiver at each end of the link may include very similar functionality.

An example of such a system may be a memory system, where there may be a complex master device (e.g., memory controller) and simpler slave devices (e.g., memory devices). The bidirectional data transfers would correspond to write data when transferring to the slave and read data when transferring from the slave.

To allow transfers to occur at high data rates, a clock phase recovery function may be implemented in the receiver at each end of the bi-directional data bus. For channels with significant high frequency loss or reflections, the channel may be equalized to prevent data eye closure from the effect of inter-symbol interference (ISI). In addition, links that have high data transfer rates may have a significant likelihood of bit errors occurring. Thus, a means of error detection is typically implemented. As mentioned above, these functions may be conventionally implemented at both ends of the link. However, it may be desirable to simplify slave devices while maintaining control of the analog properties of the data waveforms that travel in both directions.

SUMMARY

Various embodiments of a system including input offset correction for asymmetric control of high-speed bidirectional signaling are disclosed. In one embodiment, the system includes a slave device and a master device that is coupled to the slave device. The master device may be configured to control data transfer between the master device and the slave device. In response to the master device determining there is an input offset bias present within the slave device, the master device may adaptively modify a DC voltage offset of data transmitted by the master device based upon data eye information received from the slave device via one or more unidirectional signal paths.

In one implementation, the master device may transmit a predetermined pattern including a logic zero in the $15^{th}$ bit to the slave device subsequent to causing the slave device to have a negative input threshold value.

In another implementation, the master device is further configured to transmit a predetermined pattern including a logic one in the $15^{th}$ bit to the slave device subsequent to causing the slave device to have a positive input threshold value.

Figure 1:
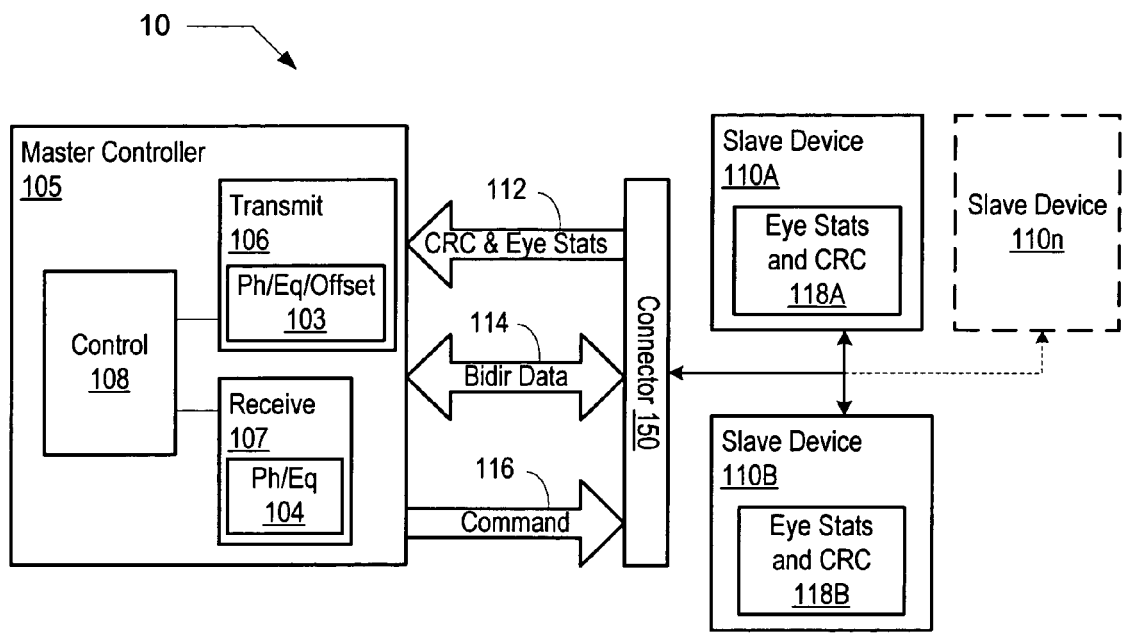
FIG. 1 is a block diagram of one embodiment of a system including asymmetric control of bidirectional data transfer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a system including asymmetric control of bidirectional data transfer is shown. System 10 includes a master controller 105 coupled to slave devices 110A through 110n via a plurality of signal paths and a connector 150. As shown, the signal paths include bidirectional (bidir) data paths 114, command paths 116, and cyclic redundancy code (CRC) and eye statistic information paths 112. It is noted that slave device 110n is meant to illustrate that any number of slave devices may be used. It is also noted that components that include a reference designator having a number and a letter may be referred to by the number only. For example, slave device 110A may be referred to as slave device 110 where appropriate.

In the illustrated embodiment, master controller 105 includes a transmit unit 106, a receive unit 107, and a control unit 108 that is coupled to both transmit unit 106 and receive unit 107. In one implementation, system 10 may be an example of a memory subsystem. As such, master controller 105 may be a memory controller and slave devices 110A-110n may be memory devices such as devices in the dynamic random access memory (DRAM) family of memory devices, for example. As such, connector 150 may be a connector such as may be found on a memory module that includes a plurality of memory devices such as slave devices 110. In addition, command paths 116 may convey address and control information, and the bidirectional data paths 114 may convey data in both directions. CRC and eye stats paths 112 may convey CRC information from slave 110 to master controller 105. As described in greater detail below in conjunction with the description of FIG. 2, CRC and eye stats paths 112 may also convey data signal phase information generated by slave device 110. It is noted that in general, system 10 may be representative of any type of system that employs bidirectional data paths.

In one embodiment, CRC and eye stats path 112 may include two signal paths, although any number of signal paths may be used. The bidirectional data paths 114 may include a number of eight-bit (byte-wide) data paths. For example, the full data path may be 64 bits wide, but the data path may be divided into byte-sized portions, the full data path may include any number of data bits, and be divided into different sized portions.

As mentioned above, many conventional systems control high-speed bidirectional communication by implementing control functions such as clock phase recovery, channel equalization, error detection, for example, in both communicating devices. However, as described in greater detail below, slave device 110 may be simplified. As such, master controller 105 may include control functionality that may dynamically and adaptively adjust the signal characteristics (e.g., phase and equalization, and voltage offset, etc.) of transmitted data to enable slave device 110 to correctly read the data based upon information received from slave device 110. In addition, master controller 105 may adjust the internal receiver characteristics to enable master controller 105 to receive data sent by slave device 110.

More particularly, at high data rates the uncertainties of delays in the transmission path for different signals in a bus require a per bit phase adjustment of a sample clock of the receiver. To avoid employing this circuitry in slave device 110, master controller 105 may adjust the phase of its transmitted signal to align with the sample clock generated inside the slave device, thus avoiding complex phase shifting circuits in the slave.

Thus, transmit unit 106 receives information from slave device 110 that may be used to adjust its transmit phase. As such, slave device 110 may include eye statistics and CRC generation logic 118 that may accumulate statistics about the edge position of data transitions using a phase detector (shown in FIG. 2) that is sometimes referred to as a "bang-bang phase detector." The early/late signals from this detector may be integrated and sent to master controller 105 via the uni-directional CRC signal paths 112. In one implementation, slave device 110 may send this information to master controller 105 for each received "bit lane" or data path.

In addition, at high data rates the probability of a slave device 110 or master controller 105 receiving a bit error is significant. Accordingly, it may be necessary to protect transfers with an error detection code that will robustly detect multiple bit errors within a protected block. When an error is detected on the link in either direction master controller 105 may correct the error by retrying the operation.

Figure 2:
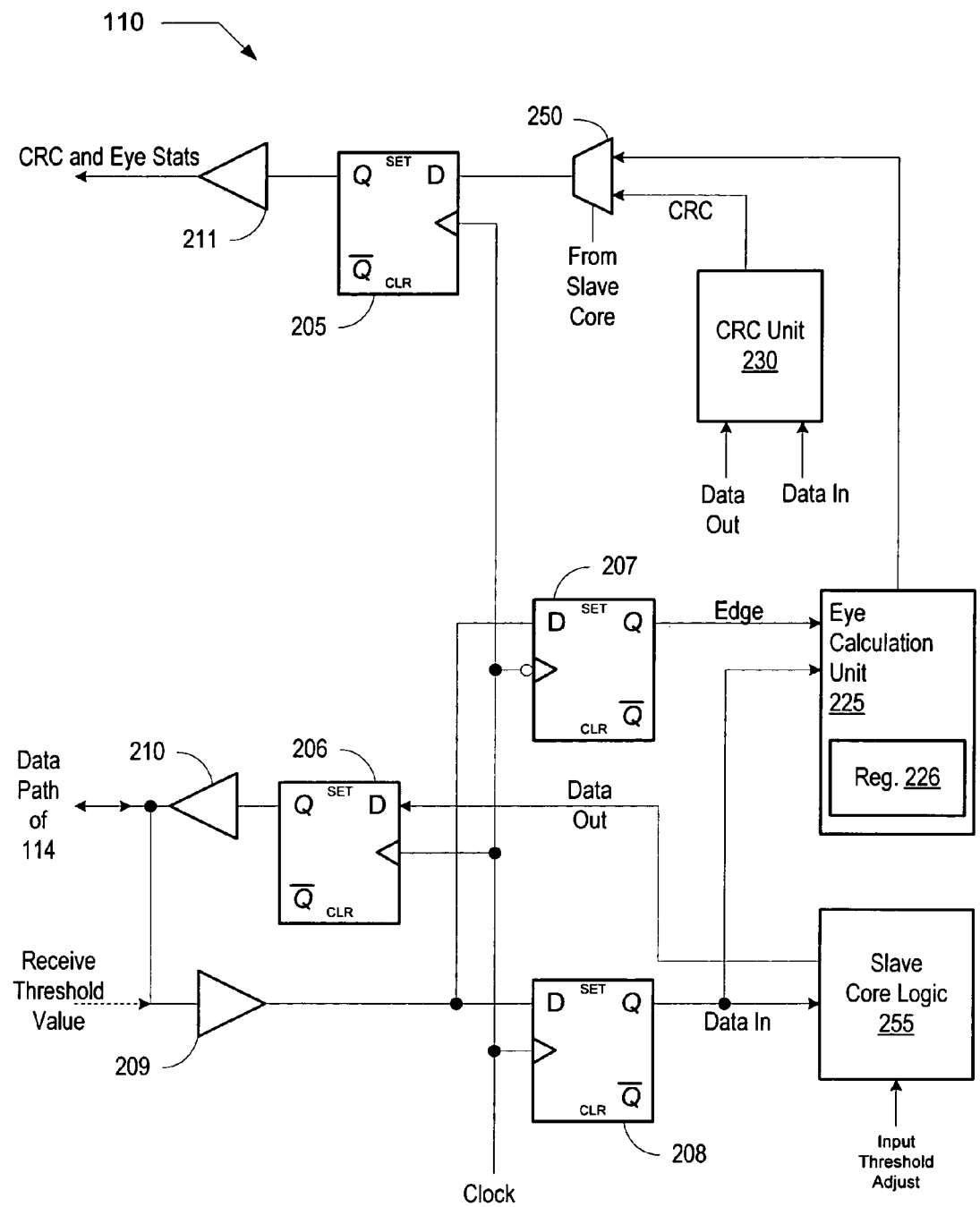
FIG. 2 is a diagram illustrating more detailed aspects of one embodiment of the slave device of FIG. 1.

In one embodiment, a CRC code may be used to provide multiple bit error detection. More particularly, as shown in FIG. 2, to simplify the logic in the slave device and reporting of errors to master controller 105, slave device 110 calculates a CRC based on either the data it is generating or the data that it is receiving. Accordingly, to transfer the CRC information back to master controller 105 one or more uni-directional CRC signal paths 12 may be used. As shown in FIG. 2, CRC generation unit 230 which calculates the CRC based on its internal data, and sends the CRC data back to master controller 105.

In one embodiment, the CRC information may be calculated and sent in parallel with the data on a transfer from slave device 110 to master controller 105 so that the CRC may be available at the same time as the data block it is protecting when it reaches master controller 105.

It is noted that on a transfer from master controller 105 to slave device 110 there will be some inherent delay from slave device 110 receiving the data internally, calculating the CRC and sending it to the master controller 105. However, as described further below in conjunction with the description of FIG. 5, this delay may be overlapped with a gap that is inserted on the data bus on a write-to-read and read-to-write bus transition.

Referring to FIG. 2, a diagram illustrating more detailed aspects of one embodiment of the slave device of FIG. 1 is shown. Slave device 110 includes logic 118 which includes a data input buffer 209 that is coupled to one signal path of bidir data paths 114 and to an input of a flip-flops (FF) 208. The output of FF 208 is coupled to slave core logic 255. A data out signal from slave core logic 255 is also coupled to an input of FF 206. The output of FF 206 is coupled to a data output buffer which is coupled to the same signal path. The input of FF 207 is also coupled to the signal path of bidir data paths 114. The output of FF 207 is coupled to eye calculation unit 225. The output of eye calculation unit 225 is coupled to one input of a multiplexer 250. The data in and data out signals are also coupled to a CRC unit 230, the output of which is in turn coupled to the other input of multiplexer 250. The output of multiplexer 250 is coupled to the input of FF 205. The output of FF 205 is coupled to a buffer 211, which is coupled to one signal path of CRC and eye stats signal paths 112. A slave sample clock signal is coupled to each clock input of FF 205-208.

In the illustrated embodiment, FF 207 and FF 208 sample the analog voltage signal at the output of buffer 209 at the edge and center of the data signal, respectively. These two samples are the inputs to eye calculation unit 225, which may calculate various statistics about the received data eye. To adjust the phase of the data transmitted by master controller 105, every edge transition may be accumulated in a counter/register 226 within eye calculation unit 225. In one implementation, early and late edges increment and decrement register 226, respectively, which may provide a scaled index for the phase of the transmit data. As described further below, additional statistics may also be accumulated to adjust transmitter equalization and input receiver offset adjustment of master controller 105.

In one embodiment, the phase information accumulates for each data bit transition received. This phase information may be accumulated over a 16-bit burst on a per data path basis. Register 226 may be a 4-bit counter that may be incremented or decremented depending on the transition being late or early. Slave device 110 may send a single bit per data path back to master controller 105 per 16-bit burst to indicate whether the 4-bit counter value is positive or negative. After receiving the transition error information, control unit 108 may further integrate this transition information to control the phase of the transmitted data. As such, transmit unit 106 may adjust or modify the phase of the transmitted data until slave device 110 is locked to the data.

As mentioned above, master controller 105 may adjust receiver circuitry to correctly receive the data sent by slave device 110. In one embodiment, receive unit 107 includes sample clock adjustment logic 103 that may include a bang-bang phase detector similar to the phase detector shown in FIG. 2. As such, when master controller 105 is receiving data from slave device 110, receive unit 107 may use the bang-bang phase detector to adjust its own local sample clock to more optimally receive data transmitted by slave device 110. This is described in more detail below in conjunction with the description of FIG. 3.

In addition to phase adjustment of the transmitted data and adjustment of the receive sample clock within receive unit 107, it may be necessary to equalize data path channels. More particularly, due to the high frequency loss of the channel and/or reflections that may be caused by multiple slave devices 110 attached to the same channel (as shown in FIG. 1), data paths may need to be equalized. Equalization of the data paths may optimize the eye opening in the receiver logic of slave device 110. Accordingly, in one embodiment, transmit unit 106 includes a phase and equalization unit 103, which employs a finite impulse response (FIR) filter having a plurality of coefficients to drive its output digital-to-analog converter stage.

In one embodiment, the coefficients for the FIR filter may be trained or adaptively modified to the characteristics for each individual data path. To allow the transmit unit 106 to adjust its equalization, master controller 105 receives from slave device 110 error information that corresponds to the ISI that is seen at each input of slave device 110.

To simplify or reduce the logic needed within slave device 110, equalizer unit 103 within transmit unit 106 may also use the logic 118 within slave device 110 that samples data phase to determine how well it is equalizing the channel. To enable slave device 110 to generate an error value of the received eye amplitude, master controller 105 sends commands to slave device 110 that may cause slave device 110 to change its input receive threshold by some offset amount. This offset may be chosen such that on a correctly equalized channel, there may be approximately a 50% error rate, and deviation from this 50% error rate may indicate to master controller 105 an error in the equalization it is performing within transmit unit 106. Alternatively as shown in FIG. 2, master controller 105 may provide a receive threshold value by supplying it directly to slave device 110 via another signal path in the interface.

In one implementation, master controller 105 may transmit blocks of 16 bits, and slave device 110 reports the value sampled for the 15$^{th}$ bit of this current 16-bit block. Master controller 105 may transmit random data for all of the data bits in this block except for the 15$^{th}$ bit, which may be a predetermined value chosen to match the offset value that slave device 110 is using within its receiver. Since master controller 105 knows what data values it is transmitting, it can use these data values on a per coefficient basis to adjust each coefficient's value depending on the sign of the error bit returned by slave device 110. The transmit coefficients are then trained using an algorithm such as the sign-sign LMS adaptation algorithm, for example. The number of coefficients to be trained may be a function of the length of the tail of the channel's pulse response.

In one implementation, master controller 105 may use a four tap decision feedback equalizer (DFE) to correct a pulse response that includes nulls in the channel's transmission response that may include reflections due to the slave device stubs caused by the multi-drop data bus. However, it is contemplated that in other embodiments other numbers of taps may be used to cover, for example, any reflections that may be caused by a round trip of the channel.

Figure 3:
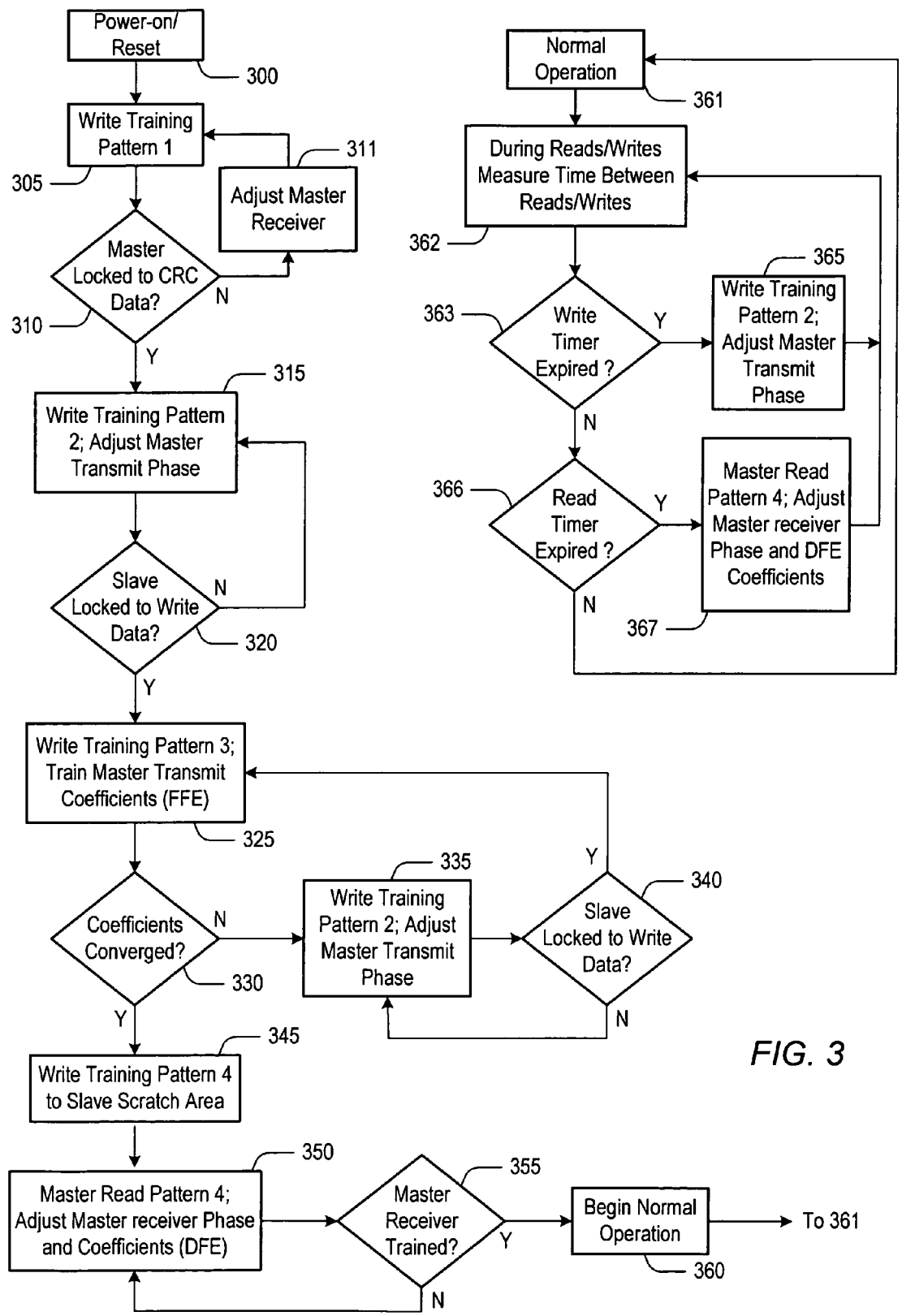
FIG. 3 is a flow diagram describing the operation of the embodiments shown in FIG. 1 and FIG. 2.

FIG. 3 is a flow diagram describing the operation of the embodiments shown in FIG. 1 and FIG. 2. More particularly, as described above, the master controller may be configured to adaptively modify its transmit and receive characteristics such that it may transmit data that may be received correctly by the slave device, and it may correctly receive the data sent by the slave device.

Referring collectively to FIG. 1 through FIG. 3 and beginning in block 300 of FIG. 3, after a reset or power-on condition, the receive unit 107 of master controller 105 may be trained to receive at least the two data paths of the CRC paths 112. Accordingly, master controller 105 writes a known first training pattern to a predetermined location within slave device 110 (block 305). In response to the write, slave device 110 generates and sends a CRC based upon the received data via CRC paths 112. Master controller 105 receives the CRC and determines if the receive unit 107 is locked to the CRC data (block 310). If the master is not locked to the CRC data, control unit 108 may cause the phase and equalization for the receive unit 103 to be adjusted (block 311) and the write pattern to be resent (block 305).

When master controller 105 determines that the receive unit 107 is locked to the CRC data (block 310), master controller 105 attempts to train the transmit unit 106 to send data that the slave device 110 can correctly receive. More particularly, master controller 105 sends a second training pattern to slave device 110 (block 315). In one implementation, the second training pattern may be a pattern that may not need the data paths to be equalized. For example, a pattern such as 11001100b may be used. Based upon the CRC data and edge statistics received from slave device 110, master controller 105 determines whether the slave device 110 is correctly locked to the write data (block 320). If the master controller 105 determines that the slave is not locked to the data, control unit 108 may cause the phase of the transmitted data to be adjusted, and the pattern to be resent (block 315).

If however, the CRC and eye statistic information indicates that the slave device 110 is locked to the transmitted data (block 320), master controller 105 may attempt to equalize the data paths of bidir data paths 114. In one embodiment, master controller 105 sends a third training pattern to slave device 110 (block 325) via bidir data paths 114. In one implementation, the third pattern may be a more randomized pattern. Once again, based upon received CRC data, master controller 105 may determine if the coefficients of a multiple tap feed forward equalizer (FFE) are converged (block 330). In addition, the phase alignment of the transmitted data may move during the adjustment of the coefficients, thus the phase may also be rechecked and adjusted using training pattern two (blocks 335 and 340). Thus as shown, master controller 105 may adapt the coefficients and track the phase iteratively until both the coefficients have converged, and the transmitted data phase is aligned (block 330).

Once the transmit data phase has been aligned and the transmit data paths have been equalized, the characteristics of receive unit 107 may be adjusted and trained to reliably receive data on the bidir data paths 114. Accordingly, master controller 105 transmits a fourth pattern to be stored to a storage location (not shown), for example, within the slave device 110 (block 345). Master controller 105 performs a subsequent read of the fourth pattern from slave device 110. Since the pattern is known, control unit 108 may cause the phase and equalization of receive unit 106 to be adjusted to reliably receive the data sent from slave device 110 (block 350). If master controller 105 determines the receiver is not trained (block 355), master controller 105 may initiate further reads of the pattern data, and further adjustment may be made (block 350). Once the receive unit 106 has been trained, system 10 may begin normal operations, during which master controller 105 may perform reads and writes to slave device 110.

Proceeding to block 361, during normal operation of system 10, the phase may drift. The phase alignment may be continually checked by master controller 105 as long as there are reads and writes occurring and data being transferred on the data paths. However, large gaps in bus traffic may allow the phase to drift undetected. As such, if there is a gap in the reads and writes that exceeds a predetermined amount of time, master controller 105 may initiate dummy write and read cycles to keep the phase of the transmit unit 106 and receive units 107 trained.

More particularly, in one embodiment, control unit 108 may measure the time elapsed between consecutive reads and between consecutive writes (block 362) using timers, for example. If the write timer expires (too much time elapses between two writes) (block 363), control unit 108 may cause one or more dummy write cycles to occur which includes writing the second training pattern to slave device 110. Based upon the CRC and eye statistics received, control unit 108 may cause the phase of transmit unit 106 to be adjusted (block 365).

Similarly, if the read timer expires (too much time elapses between two reads) (block 366), control unit 108 may cause one or more dummy read cycles to occur which includes reading the fourth training pattern from slave device 110. Control unit 108 may cause the phase of receive unit 107 to be adjusted (block 367). Once trained or checked, operation may proceed normally as in block 361. It is noted that in other embodiments, master controller 105 may initiate the dummy read and write cycles dependent upon factors other than elapsed timers. For example, master controller 105 may initiate retraining of the transmit unit 106 and receive unit 107 based upon error rates of received data or CRC bits.

Slave Device Input Offset Correction

As described above, master controller 105 may transmit random data or deterministic data for all of the data bits in this block except for the $15^{th}$ bit, which may be a predetermined value (e.g., logic zero or logic 1) chosen to match the receiver threshold value that slave device 110 is using within its receiver. By changing the polarity of the receiver threshold used in the receiver of slave device 110, master controller 105 may determine whether there is any bias in the error rate for a logic 1 versus a logic 0 as sampled in the $15^{th}$ bit of a 16-bit burst. More particularly, in one embodiment, the master controller 105 may cause the slave device 110 receiver to have a negative threshold value and then send a pattern with a logic zero in the 15th bit. Master controller 105 may collect the data eye information returned by slave device 110. Next, master controller 105 may cause the slave device 110 receiver to have a positive threshold value and then send a pattern with a logic one in the 15th bit. Again, master controller 105 may collect the data eye information. From the eye information master controller 105 may determine whether there is any bias in the error rate. This bias may indicate an input offset in the receiver of slave device 110. Master controller 105 may compensate for the offset by shifting the voltage of its transmitted waveform up or down (i.e., modifying the DC voltage offset of the waveform). In one implementation, transmit unit 106 may correct up to +/−50 mV of a slave device receiver's input offset, although in other implementations more or less offset may be compensated.

Data Scrambling

When transferring data at high data rates via a lossy channel, some data patterns have a higher probability of generating bit errors than others. In addition, most channels of interest consist of multiple parallel wires which can exhibit significant crosstalk between the data paths in the bus. This crosstalk can be generated by coupling between parallel conductors on a printed circuit board, coupling in via arrays, connectors, packages, sockets, and the like. Similarly, in the case of a single ended switching system, crosstalk may be a result of multiple outputs switching simultaneously.

Figure 4:
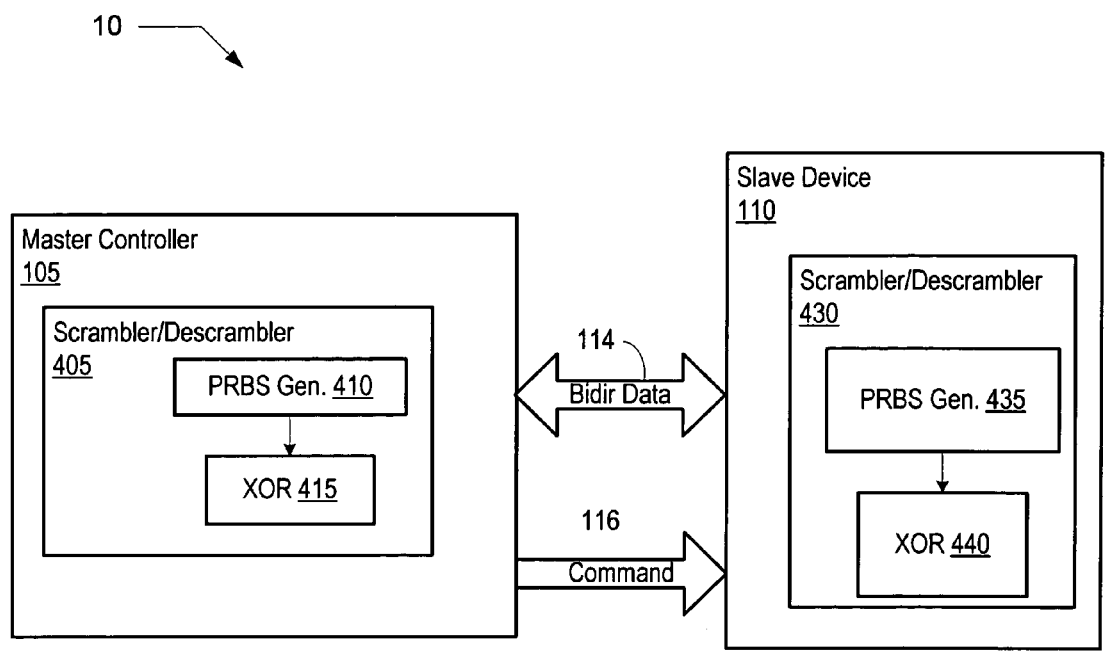
FIG. 4 is a block diagram that illustrates additional details of the embodiment of the system of FIG. 1 including scrambling and de-scrambling logic.

Referring to FIG. 4 a block diagram that illustrates one embodiment of the system of FIG. 1 including scrambling logic is shown. It is noted that in addition to the functionality described below, master controller 105 of FIG. 4 may include all the functionality of master controller 105 of FIG. 1. Likewise, slave device 110 of FIG. 4 may also include all the functionality of slave device 110 of FIG. 1. However, for simplicity, that functionality is not duplicated here. Since the data to be transferred is not guaranteed to be random there is a possibility that a pathologically bad data pattern may be transferred on a victim line and its significant aggressors. To avoid this causing an undesirable increase in the bit error rate of the link, the data on each path may scrambled. In one implementation, the data may be combined with an output of a pseudo random binary sequence (PRBS) using an exclusive-OR (XOR) function.

In one embodiment, master controller 105 and slave device 110 may include identical PRBS generators which may be initialized during training. Depending on direction of data flow, one end of the link scrambles the data with the known PRBS and the other end de-scrambles it with its local PRBS generator. Accordingly, master controller 105 includes a scrambler/descrambler 405 that includes a PRBS generator 410 that is coupled to an XOR block 415. Similarly, slave device 110 includes a scrambler/descrambler 430 that includes a PRBS generator 435 that is coupled to an XOR block 440.

To avoid correlation between data paths, each path may be scrambled with a different PRBS, thereby effectively smearing out, in the frequency domain, any pathologically bad crosstalk data patterns and allowing their effects to be evaluated statistically with normal distributions. Scrambling the data may also help to ensure that the data patterns that are generated are spectrally white in the frequency domain so that the LMS adaptation algorithm will not have any biased statistics for any of the tap coefficients that it may be adapting.

In one embodiment, to minimize the implementation cost, each of the PRBS generators 410 and 435 may be implemented from a master PRBS generator that includes multiple taps. A different generator tap may be XORed with data from each data path to generate a non-overlapping PRBS per path. The choice of taps may be made to maximize the difference between the sequences used on each path.

In embodiments in which slave device 110 may be a memory device, data may be stored in the scrambled state, thus avoiding the cost of implementing scrambling in the memory devices. To ensure that master controller 105 can decode the scrambled data, a scrambling seed may be calculated from a hash of the storage address of the data, thus the data transferred over the bus may remain statistically random even for the case of frequently occurring sequential memory access patterns.

In one implementation, a hash of the address may be generated by pre-loading the scrambler PRBS with the address of the block to be accessed and then shifting the PRBS generator by some fixed number of stages, thereby randomizing the address to create a unique seed for each block of data transferred to and from the memory. It is noted that in a system that uses critical word order, additional care may be taken to ensure that the de-scrambling takes into account the wrapping that will occur when the first address access does not occur on a block boundary. In such cases, an appropriately wrapped scramble pattern may be computed for that block of data.

It is also noted that when storing scrambled data in memory devices, access to memory device control registers would not naturally be scrambled. As such, it may be desirable to ensure that the control information transfers also behave as random data by appropriately defining the sense of the memory device control register bit values to minimize the likelihood of the pathologically bad data patterns. For example, the memory device control register bits may be changed such that a logic one may mean one thing in one bit location while it might the opposite in another location. Accordingly, the bits having the same logic value may be distributed to appear more random.

Slave to Master Latency Reduction

To get adequate error coverage from the CRC while minimizing impact on bus efficiency, the data may be grouped in blocks over which the CRC is calculated. On a transfer from slave device 110 to master controller 105, the correctness of the data in the block cannot be established until all of the data block and the CRC have been received. However, this increases the latency for the first portion of the block which might be a critical word for forward progress in the system.

Figure 5:
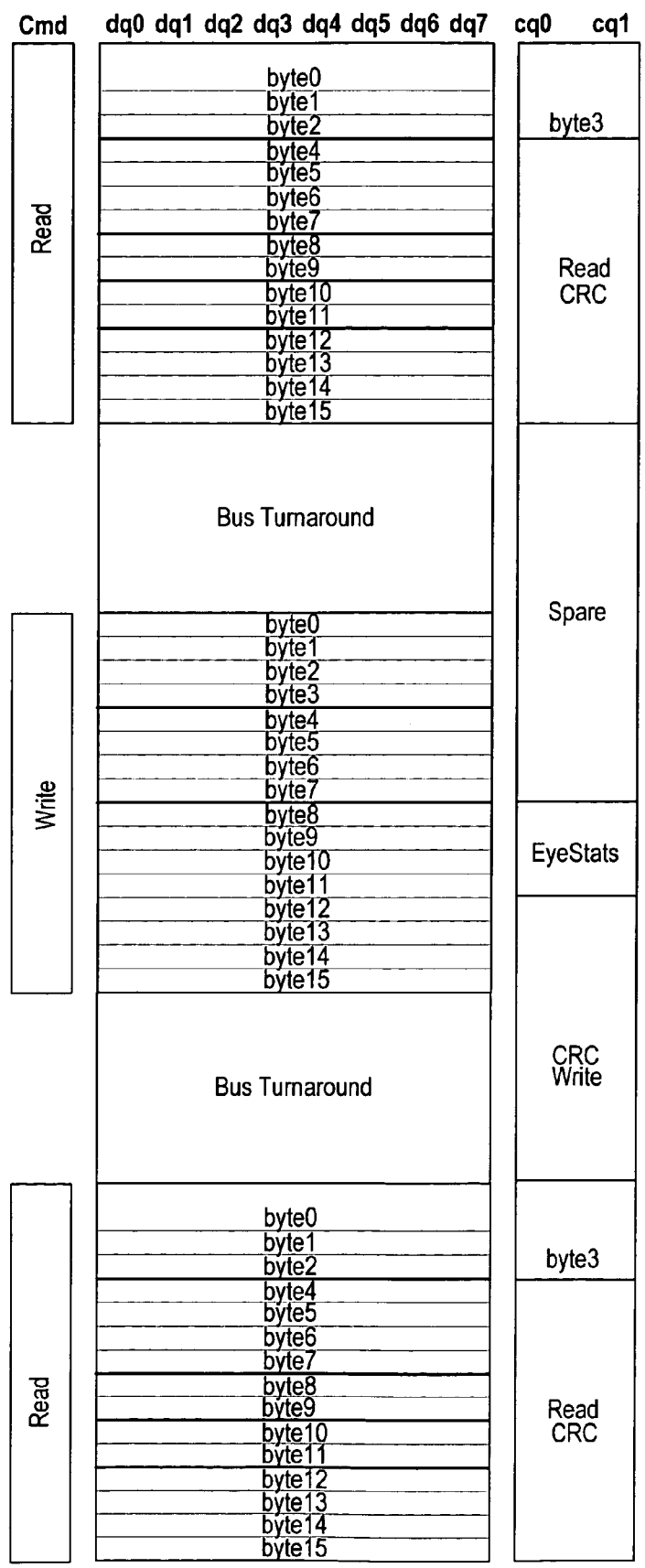
FIG. 5 is a diagram illustrating an embodiment of an exemplary encoding across a byte group.

Referring to FIG. 5, a diagram illustrating an exemplary encoding across a byte group is shown. In one embodiment, the critical word may be additionally protected by including an additional in-line error code that is inserted between the critical word and the rest of the block. For example, as shown in FIG. 5, the additional error detection information may be implemented by repeating the critical word (e.g., byte 0) at the beginning of the block. By sending the critical word twice, master controller 105 may validate that each bit is identical between the two copies and substantially lower the error rate for the critical word, thus allowing the critical word to be treated as valid before the complete CRC for the block has been received. Said in another way, during a read operation, slave device 110 may send the critical word during the first two beats or bit times of the read block.

In the embodiment shown in FIG. 5, two CRC signal paths protect 8 data paths using a burst of 16 bits. To allow room for two copies of the critical word, byte 3 is output on the CRC paths during the first four beats of the read block. This also allows the read CRC to be calculated after the delivery of the critical word. On a write, the CRC calculation takes longer and so 12 bit times are allowed for this calculation and the overlap on a write-to-read turn around occurs in the bus turnaround delay. It is noted that the CRC does not change direction between reads and writes. As shown, this encoding may provide some additional bandwidth that may be used to output write data eye statistics. It is also noted that when there are more than one slave device, it may be necessary to insert a gap (i.e., bubble) when master controller 105 controller changes the slave device to which it is reading or writing.

Skew Management Across a Byte Group

To reduce the complexity in slave device 110 and master controller 105 the skew between data paths in a byte group can be controlled in the design of the slave device 110, master controller 105 and the PCB routing. In one embodiment, the maximum skew between bits within a byte group may be controlled to within 0.1UI at 3.2 Gb/s which allows the different data paths in the group to be treated the same for equalization.

By controlling the skew in this manner, the noise generated by simultaneously switching output (SSO) may be aligned accurately at the received data eye edge, thereby minimizing its impact on eye closure. However this may not provide any relief for SSO affects on the master controller receive CRC data while it is transmitting and so additional burden may be placed on the master to correctly receive the resulting smaller data eye. However, this may be mitigated by the master controller having an external reference voltage for its input receivers that is internally terminated and referenced to signal ground of the CRC receive bits. By doing so, the SSO noise may be converted to common mode noise and thus rejected by the input receiver for the CRC bits.

Byte Mode Writes to Memory

Figure 6:
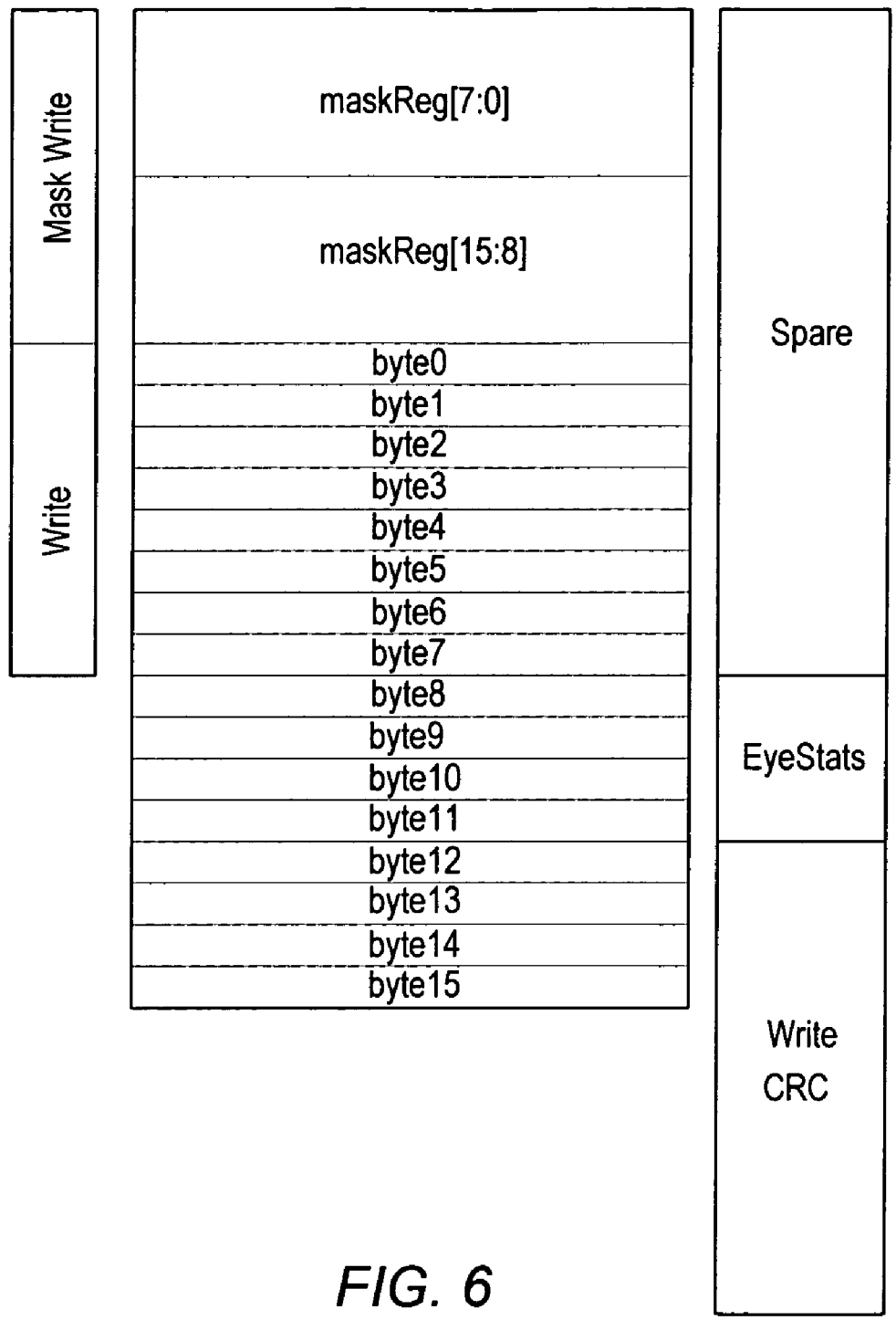
FIG. 6 is a diagram illustrating an embodiment of an encoding of a masked write operation.

In some memory applications, it may be desirable to support a byte write feature between a memory controller and a memory device to avoid a read/modify/write operation on a burst-oriented transaction. As such, in embodiments in which master controller 105 is a memory controller and slave device 110 is a memory device, byte writes may be implemented using a masked writes. Referring to FIG. 6, a diagram illustrating an embodiment of a masked write operation is shown. The additional bandwidth for the mask write is accomplished by preceding the write data payload with a short burst of eight bits that contains the mask information.

Since master controller 105 will not generally know the contents of the memory that is not to be modified, a bit error in the mask information could cause data in memory to be incorrectly modified. To overcome this problem, master controller 105 transmits the mask information for four consecutive bit times and slave device 110 uses the third bit time to sample the data. More particularly, in one embodiment, the third bit time is guaranteed to be stable by device specification. However, it is noted that in other embodiments, mask information may be transmitted for other numbers of consecutive bit times. As such, other bit times may be guaranteed to be stable and slave device 110 may use the stable bit time to sample the data.

Single Ended Switching I/O Topology

Figure 7:
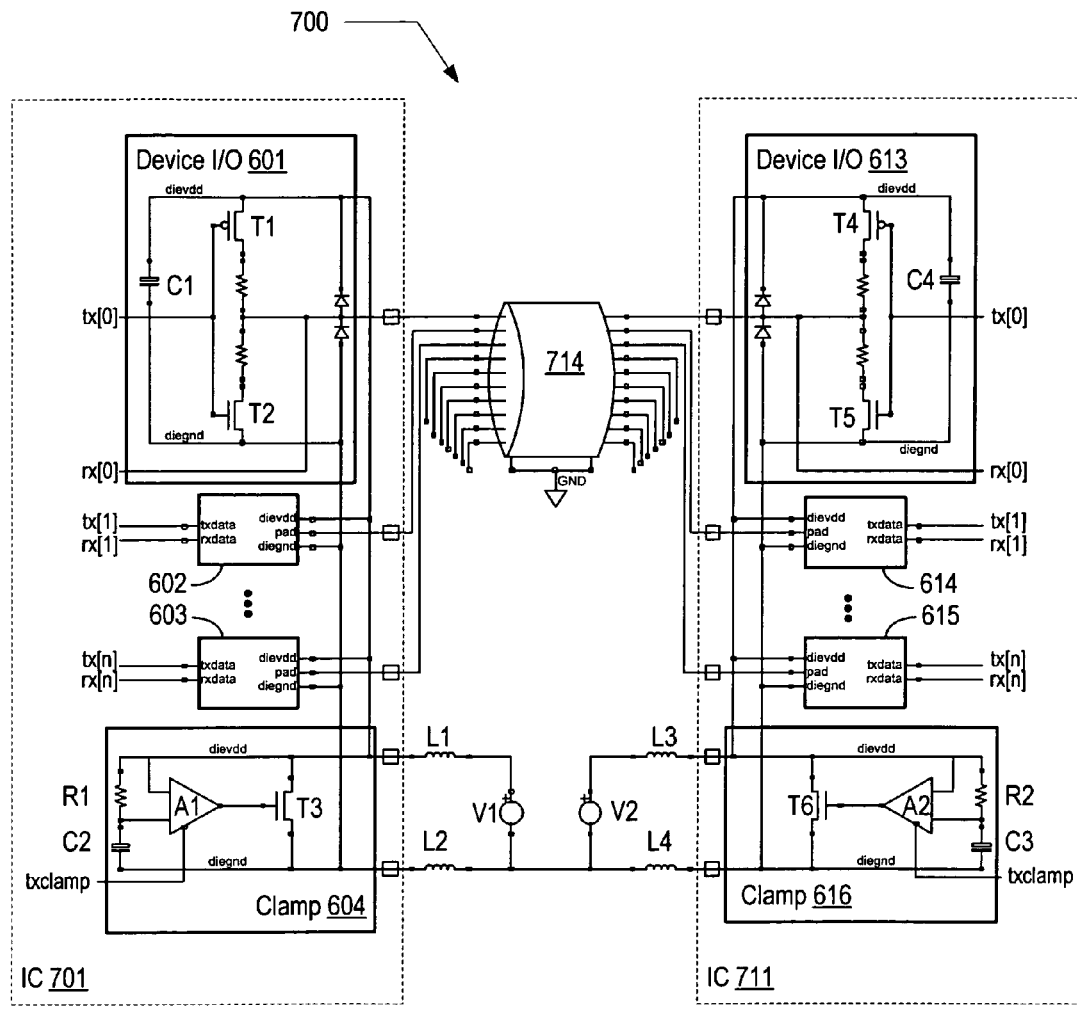
FIG. 7 is a diagram of one embodiment of a single ended switching bi-directional signaling scheme.

FIG. 7 is a diagram of one embodiment of a system employing a single ended switching bi-directional signaling scheme. In the case of single ended switching signaling schemes such as the system of FIG. 1, minimization of pad I/O capacitance and control of on-die VDD are critical design parameters. A simple voltage mode transmitter and receiver terminator combined with a on-die shunt regulator may provide a good compromise between power consumption and a simplified I/O structure.

Accordingly, system 700 includes an integrated circuit (IC) device 701 coupled to an IC device 711 via a bus 114 including a plurality of bidirectional signal paths. For each of the bidirectional signal paths, IC 701 includes a driver circuit coupled to the signal path. As shown in FIG. 7, exemplary driver circuits are shown as device I/O 601, 602, and 603, although only the detailed aspects of device I/O 601 are shown for simplicity. As such, device I/O 601 embodies a complimentary metal oxide semiconductor (CMOS) driver circuit that includes transistors T1 and T2. The tx[0] input is coupled to the input of the driver circuit. The output is coupled to the a signal path of bus 714 and to the receive signal path rx[0]. It is noted that driver circuits 602 and 603 may include substantially the same circuit as device I/O 601.

In the illustrated embodiment, device I/O 601 is a voltage mode driver having a voltage swing of approximately VDD/2 into a transmission line (e.g., signal path of 714) terminated by an substantially equivalent driver (e.g., device I/O 613), which drives the die-pad to ground, thereby terminating the receiver to ground. It is noted that in the illustrated embodiment, the supply voltages for the two IC devices (chips) may be different voltages such as 1.5 v and 1.0 v, for example.

IC 701 also includes a shunt regulator circuit, designated clamp 604 that detects transitions in the on-die VDD that go above the average DC voltage. In addition a power delivery loop including inductors L1, L2 and voltage source V1 is shown. It is noted that the inductors L1 and L2 are representative of a model of intrinsic inductances that may be due to packaging, lead length, etc, and voltage source V1 is representative of a model of the VDD supply.

When the die VDD transitions go above the average DC voltage, the amplifier A1 turns on transistor T3, which sustains the current flow through the inductive power delivery loop (e.g., L1, V1, L2). This effectively clamps the positive voltage overshoot. This clamping in combination with transmitting scrambled data (as described above), may reduce the on-die VDD noise by more than 50% in some embodiments. To minimize noise during bus turn-around (e.g., write-to-read and read-to-write transitions) the clamp transistor T3 may be turned on for a short period prior to enabling the transmitter switching. This may pull current from the on-die VDD decoupling capacitor C1, which may in turn start increasing the current flowing through the power delivery loop. The clamp transistor T3 may be turned off prior to the first bit being transmitted which may cause an inductive ring of the on-die VDD, which may cause the shunt regulator 604 to clamp, thereby ensuring a negligible on-die VDD drop as the transmitter starts up.

As shown, IC device 711 includes substantially identical circuits and therefore operates substantially the same as IC device 701. Accordingly, the operation of IC device 711 is not described further for brevity.

It is noted that the average power of the switching I/O may not be significantly altered by this technique, whereas a driver that draws constant current from the supply for driving a 1 or 0 could consume approximately twice the average switching power.

It is noted that the IC 701 and IC 711 shown in FIG. 7 may be illustrative of any two devices that may employ a bidirectional signaling scheme between two chips. However in one embodiment, IC 701 and IC 711 may be representative of the master controller 105 and slave device 110 depicted in the embodiments described above in conjunction with the descriptions of FIG. 1 through FIG. 6.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a slave device; and
   a master device coupled to the slave device and configured to control data transfer between the master device and the slave device;
   wherein in response to the master device determining there is an input offset bias present within the slave device, the master device is further configured to adaptively modify a DC voltage offset of data transmitted by the master device based upon data eye information received from the slave device via one or more unidirectional signal paths.

2. The system as recited in claim 1, wherein the master device is further configured to transmit a predetermined pattern including a logic zero in the $15^{th}$ bit to the slave device subsequent to causing the slave device to have a negative input threshold value.

3. The system as recited in claim 1, wherein the master device is further configured to transmit a predetermined pattern including a logic one in the $15^{th}$ bit to the slave device subsequent to causing the slave device to have a positive input threshold value.

4. A method comprising:
   a master device controlling data transfer between the master device and a slave device; and
   in response to the master device determining there is an input offset bias present within the slave device, the master device adaptively modifying a DC voltage offset of data transmitted by the master device based upon data eye information received from the slave device via one or more unidirectional signal paths.

5. The method as recited in claim 4, further comprising the master device transmitting a predetermined pattern including a logic zero in the $15^{th}$ bit to the slave device subsequent to causing the slave device to have a negative input threshold value.

6. The method as recited in claim 4, further comprising the master device transmitting a predetermined pattern including a logic one in the $15^{th}$ bit to the slave device subsequent to causing the slave device to have a positive input threshold value.

7. A memory subsystem comprising:
   a memory device; and
   a memory controller coupled to the memory device and configured to control data transfer between the memory controller and the memory device;
   wherein in response to the memory controller determining there is an input offset bias is present within the memory device, the memory controller is further configured to adaptively modify a DC voltage offset of data transmitted by the memory controller based upon data eye information received from the memory device via one or more unidirectional signal paths.

8. The memory subsystem as recited in claim 7, wherein the memory controller is further configured to transmit a predetermined pattern including a logic zero in the $15^{th}$ bit to the memory device subsequent to causing the memory device to have a negative input threshold value.

9. The memory subsystem as recited in claim 7, wherein the memory controller is further configured to transmit a predetermined pattern including a logic one in the $15^{th}$ bit to the memory device subsequent to causing the memory device to have a positive input threshold value.

* * * * *